Sept. 22, 1953   G. J. PERLOW ET AL   2,653,248
PROBABILITY SCALER
Filed July 31, 1950
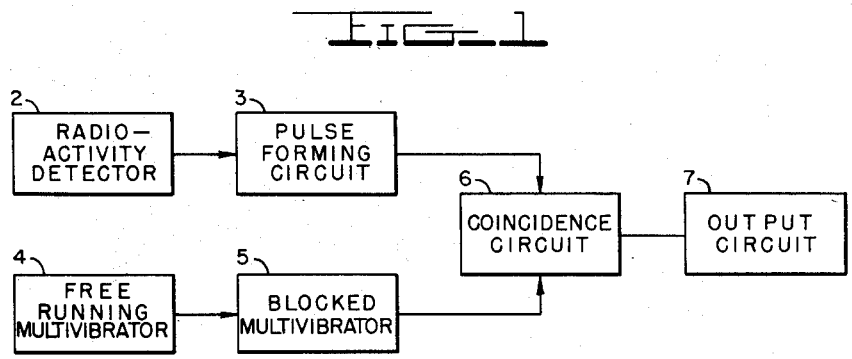
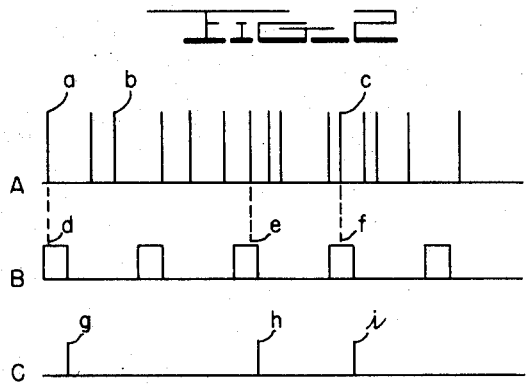
INVENTORS
GILBERT J. PERLOW
CLARENCE A. SCHROEDER
BY
ATTORNEYS Patented Sept. 22, 1953

2,653,248

UNITED STATES PATENT OFFICE 2,653,248

PROBABILITY SCALER

Gilbert J. Perlow and Clarence A. Schroeder, Washington, D. C.

Application July 31, 1950, Serial No. 176,887

5 Claims. (Cl. 250—83.3)

(Granted under Title 35, U. S. Code (1952), sec. 266)

This invention relates in general to radioactivity counter systems and in particular to a simplified apparatus for scaling down the counts or pulses appearing at random from a radioactivity source.

It is an object of the present invention to provide a new and simplified random event countdown system.

Another object of the present invention is to provide a new method and means for determining the number of counts detected from a radioactivity source.

Another object of the present invention is to provide an inexpensive pulse counting system of simple design.

Further objects and attainments of the present invention will become apparent from the following detailed description when taken in conjunction with the following drawings wherein:

Fig. 1 is a block schematic diagram of an illustrative embodiment of the present invention, and Fig. 2 is a series of pulse wave forms illustrative of the operation of the system shown in Fig. 1.

In general the present invention is operative to indicate the relative number of counts or pulses detected by a radioactivity counter such as for example, by a Geiger-Mueller counter. It is to be understood, however, that the present invention is not to be limited to any one particular type of detector and may include any radioactivity detector known to those in the art.

In conformance with the basic principles of the present invention the pulses or counts detected by the radioactivity detector are sampled a fixed number of times per second, each sampling period being of a very short duration. For a given sampling time and a given sampling rate the average number of output counts from the system is proportional to the average number of input counts from the radioactivity detector.

Generally and in operation of the preferred embodiment for determining the number of counts present in a random source the detected counts are sampled by applying the output of the radioactivity detector to a coincidence circuit. There being also applied to the coincidence circuit a series of generated pulses of a fixed duration and of a fixed repetition rate. When a generated pulse is coincident with a detected pulse there will be a pulse output at the coincidence circuit.

Referring now with particularity to Fig. 1 there is shown a preferred embodiment of the present invention operative to indicate the relative number of counts present in a radioactivity source. The pulses or counts are detected by radioactivity detector 2. Radioactivity detector 2 is preferably as disclosed in the copending application of G. Perlow et al., Serial No. 84,664, filed March 31, 1949, but may be any other known radioactivity detector.

The pulses detected by radioactivity detector 2 are reshaped in a conventional pulse forming circuit 3 and fed to coincidence circuit 6. Coincidence circuit 6 can also be of conventional design and may be any known coincidence or gating amplifier circuit. In a constructed embodiment of the present invention coincidence circuit 6 was substantially as that shown in the article by B. Howland et al. appearing in "The Review of Scientific Instruments," volume 18, No. 8, pages 551–556, August 1947. In general coincidence circuit 6 is only operative to render an output pulse upon the simultaneous application thereto of a pair of pulses.

There is also applied to coincidence circuit 6 a continuous series of pulses of known duration and frequency generated by multivibrators 4 and 5.

Multivibrator 4 is a conventional free running multivibrator having a frequency of the predetermined sampling rate. Multivibrator 4 keys multivibrator 5. Multivibrator 5 is a conventional blocked multivibrator operative to render an output pulse only upon a keying pulse applied thereto. The duration or pulse width of the output pulses from blocked multivibrator 5 is adjusted to be considerably shorter than the average spacing between the pulses detected by radioactivity detector 2.

The purpose of having the duration of the output pulses of blocked multivibrator 5 considerably shorter than the average spacing between the detected pulses is to normally prevent a pair of detected pulses appearing at the coincidence circuit simultaneously with a sampling pulse from multivibrator 5. It is understood, of course, that this will occur on infrequent occasions, however, the probability of two or more pulses appearing at the coincidence circuit simultaneously with a sampling pulse is so minute to unaffect the linearity of the output vs. input response rate from coincidence circuit 6.

The pulses appearing at the output of coincidence circuit 6 are used to key an output circuit 7. Output circuit 7 can be any type of recording instrument known to those skilled in the art for recording data.

As a further illustration of the operation of the system taught by the present invention reference is had to Fig. 2 wherein there is shown a series of waveforms useful in explaining the theory of operation of the present invention. Series A is illustrative of the random events as detected by the radioactivity detector 2 of Fig. 1 and applied to coincidence circuit 6. Series B of Fig. 2 is illustrative of the ontinuous series of sampling pulses as generated by free running multivibrator 4 and blocked multivibrator 5, that are also applied to coincidence circuit 6. The series of pulses B as previously explained have a predetermined repetition rate and are of a duration considerably smaller than the average spacing between the random events or pulses shown in series A. When one of the events or pulses of series A is coincident with one of the sampling pulses of series B there will be an output pulse at coincidence circuit 6 as shown at C of Fig. 2. Simultaneously occurring pulses at coincidence discriminator 6 is shown in Fig. 2 by pulses a, b and c of series A coinciding in time with pulses d, e and f of series B to render output pulses g, h and i at coincidence discriminator 6.

The number of pulses appearing at the output of coincidence circuit 6 of Fig. 1 (g, h and i in series C of Fig. 2) is as previously stated proportional to the number of input counts from radioactivity detector 2 and the scaling factor provided by multivibrators 4 and 5. The scaling factor provided by multivibrators 4 and 5 is equal to the product of the duration of the pulses in waveform B times the recurrence frequency of these pulses. For instance if this product is equal to .3 the output count would be .3 the input count. In other words the input count from a given output count can be readily obtained by multiplying the output count by the reciprocal of the above, in this case 3⅓.

Although we have illustrated a preferred embodiment, it is understood that it is merely illustrative and that many modifications may be made thereto without departing from the spirit and scope of the present invention.

The invention described herein may be manufactured and used by or for the Government of the United States of America for governmental purposes without the payment of any royalties thereon or therefor.

What is claimed is:

1. In combination, a random count radioactivity detector, a coincidence circuit receiving the output of said detector, a pulse generator operative to generate a continous series of pulses of a predetermined spacing, the duration of said generated pulses being adjusted to have a width less than the average spacing between the output pulses of said detector, and means for applying said generated pulses to said coincidence circuit to provide an output therefrom whenever one of said generated pulses coincides in time with an output from said detector.

2. In combination, a random count radioactivity detector, a pulse forming means for reshaping the output pulses from said detector and a coincidence circuit for receiving said last named pulses, a pulse generator operative to generate a continuous series of pulses of predetermined spacing, the duration of said generated pulses being adjusted to have a width less than the average spacing between the output pulses of said detector, and means for applying said generated pulses to said coincidence circuit to provide an output therefrom whenever one of said generated pulses coincides in time with an output from said detector.

3. In combination, a random count radioactivity detector, a coincidence circuit for receiving the output of said detector, a first pulse generator operative to develop a continuous series of pulses of a predetermined spacing, a second pulse generator keyed by said series of pulses operative to develop a continuous series of pulses of a predetermined time duration which is less than the average time duration between the random output counts of said detector, and means for applying said generated series of pulses to said coincidence circuit to provide an output therefrom whenever one of said generated pulses coincides in time with an output from said detector.

4. In combination, a random count radioactivity detector, pulse forming means for reshaping the output pulses from said detector and a coincidence circuit for receiving the output of said detector; a first pulse generator operative to develop a continuous series of pulses of a predetermined spacing, a second pulse generator keyed by said series of pulses operative to develop a continuous series of pulses of a predetermined time duration which is less than the average time duration between the random output counts of said detector, means for applying said generated series of pulses to said coincidence circuit to provide an output therefrom whenever one of said generated pulses coincides in time with an output from said detector and indicator means for indicating the output of said coincidence circuit.

5. The method of scaling down the random counts of a radioactivity detector comprising the steps of feeding the random counts of said detector to an open transmission path, closing said path at predetermined intervals for a duration which is less than the average time duration between said random counts, and totalizing the random counts which are passed through said transmission path.

GILBERT J. PERLOW.
CLARENCE A. SCHROEDER.

References Cited in the file of this patent

UNITED STATES PATENTS

| Number | Name | Date |
| --- | --- | --- |
| 2,484,352 | Miller et al. | Oct. 11, 1949 |

OTHER REFERENCES

"Circuits for the Control of G-M Counters etc.," Johnson, Review of Scientific Instruments, July 1938, vol. 9, pp. 218–223.